VARIABLE PIEZOELECTRIC DELAY LINE

Original Filed Aug. 26, 1968 3 Sheets-Sheet 1

INVENTOR
HUGO W. SCHAFFT
BY
Mueller, Aichele and Rauner
ATTYS.

VARIABLE PIEZOELECTRIC DELAY LINE

Original Filed Aug. 26, 1968 3 Sheets-Sheet 2

INVENTOR
HUGO W. SCHAFFT
BY
Mueller, Aichele and Rauner
ATTYS.

VARIABLE PIEZOELECTRIC DELAY LINE

Original Filed Aug. 26, 1968 3 Sheets-Sheet 3

INVENTOR
HUGO W. SCHAFFT

BY
Mueller, Aichele and Rauner

ATTYS.

United States Patent Office

Re. 27,693
Reissued July 3, 1973

27,693

VARIABLE PIEZOELECTRIC DELAY LINE

Hugo W. Schafft, Des Plaines, Ill., assignor to Motorola, Inc., Franklin Park, Ill.

Original No. 3,537,039, dated Oct. 27, 1970, Ser. No. 755,098, Aug. 26, 1968. Application for reissue Feb. 19, 1971, Ser. No. 117,022

Int. Cl. H03h *9/30*

U.S. Cl. 333—30 R 15 Claims

Matter enclosed in heavy brackets [ ] appears in the original patent but forms no part of this reissue specification; matter printed in italics indicates the additions made by reissue.

ABSTRACT OF THE DISCLOSURE

A delay line is made of polarized piezoelectric material and is shaped in the form of an elongated hollow tube. Input electrodes and output electrodes are formed on opposite ends of the tube in such a manner that electrical signals applied to the input electrodes develop an electric field in the polarized piezoelectric material so as to create a torsional vibration of the tube. The output electrodes act to convert the torsional vibration to an electrical signal substantially the same as the input electric signal. Control electrodes are positioned intermediate the input and output electrodes and a potential applied to the control electrode acts to vary the delay time.

BACKGROUND OF THE INVENTION

A delay line has application in a variety of electronic circuits. For example, in color television receivers of a particular design, in order to separate the brightness information in the color information, it is desirable to delay the video signal for the duration of one horizontal line or 63.5 microseconds. A delay line for providing this delay desirably has the characteristic of delaying each frequency by the same amount and providing the same amount of attenuation for each frequency in order that the output signal will not be distorted.

In the past, delay lines were formed of electrical components, such as a combination of inductors and capacitors. Such delay lines are expensive to manufacture and are space consuming. Furthermore, each line must be individually adjusted, as for example by varying the number of turns on the inductors, to achieve the desired delay. While delay lines which can be easily varied are available they are even more bulky and more expensive than the fixed delay lines.

It is, therefore, desirable to replace the electrical components with an electromechanical device which converts between electrical and mechanical wave energy. Prior attempts to design such a device have not been entirely satisfactory. Some of these devices have separate input and output transducers bonded to the delay medium which has introduced substantial losses. Variable delay lines have required that at least one of the transducers be moved relative to the delay line in order to provide for adjustment of the delay. Some piezoelectric delay lines were driven into a longitudinal mode which made the delay time frequency dependent. Other types of delay lines have a bandwidth which is too narrow for many applications. While relatively inexpensive electromechanical delay structures can be obtained, as for example where the delay medium is a glass, the time and labor required to grind such a delay line to the exact length needed to give the required delay time to the required degree of accuracy has resulted in such types of delay line becoming very expensive.

SUMMARY OF THE INVENTION

It is, therefore, an object of this invention to provide an improved delay line in which the delay and insertion loss is independent of frequency over the desired range of operation.

Another object of this invention is to provide a delay line which has a wider bandwidth and more constant delay over a wide operating range.

Another object of this invention is to provide an electromechanical delay line which operates in a torsional mode.

Another object of this invention is to provide a delay line wherein the amount of delay can be simply and accurately controlled.

Another object of this invention is to provide a delay line which is relatively inexpensive to manufacture.

The delay line of this invention includes a hollow tube formed of piezoelectric material and having dimensions such that the waveguide modes of the tube will occur above the hghest desired operating frequency. The tube has circumferential and axial dimensions and is polarized in one of such dimensions, as for example the circumferential dimension. Input electrodes are positioned on one end of the tube in such a manner that an applied electric signal develops an electric field in the piezoelectric material in the direction of the axial dimension. The electric field applied to the axial dimension causes the tube to vibrate in the torsional mode. This torsional vibration is propagated by the tube to the other end of the tube where output electrodes are positioned in such a manner that the torsional vibration develops an electric signal across the output electrodes. Both the input and output "transducers" are formed as part of the delay line structure and are not separate.

In order to provide accurate control of the amount of delay provided by the device, control electrodes are positioned intermediate the input and output electrodes. The control electrodes are so positioned that a potential applied thereto develops a potential gradient across the walls of the tube to thereby determine the velocity of propagation of the torsional wave from the input electrodes to the output electrodes. Varying the potential applied to the control electrodes will vary Young's modulus and thus control the velocity of propagation and the length of delay. The tube can also be opened out into a flattened form having a rectangular cross-section.

The invention is illustrated in the drawings of which:

DESCRIPTION OF THE INVENTION

Figure 1:
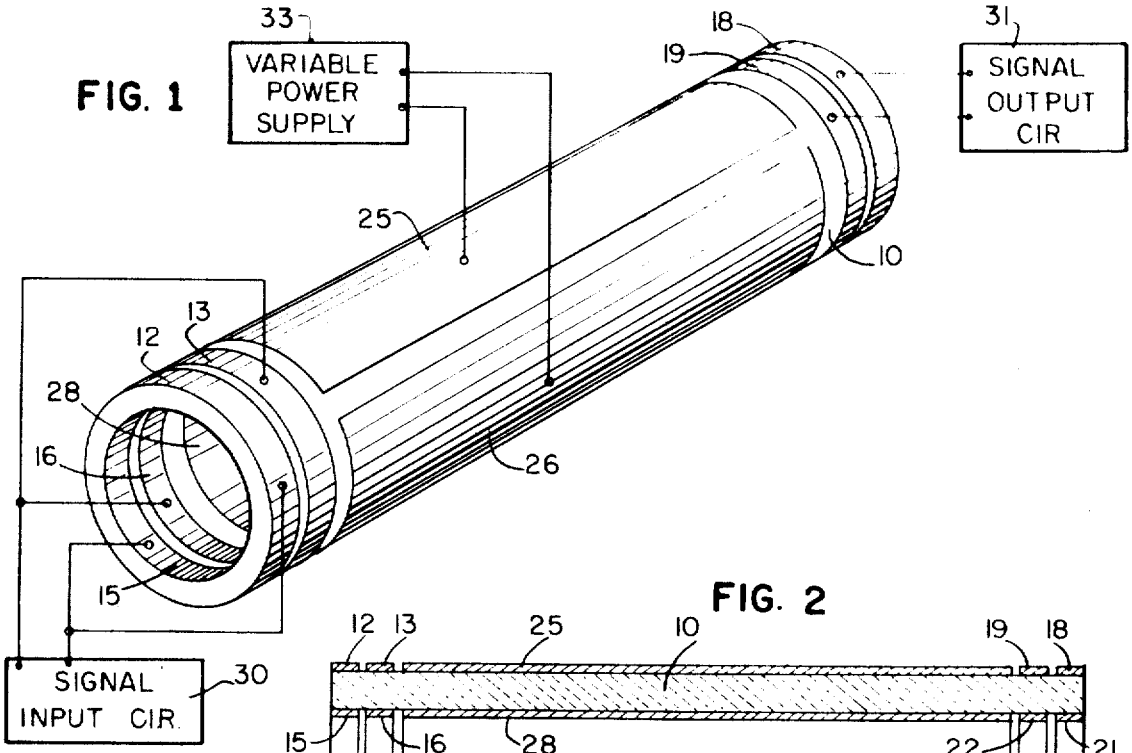
FIG. 1 is an isometric view of the delay line.
Figure 2:
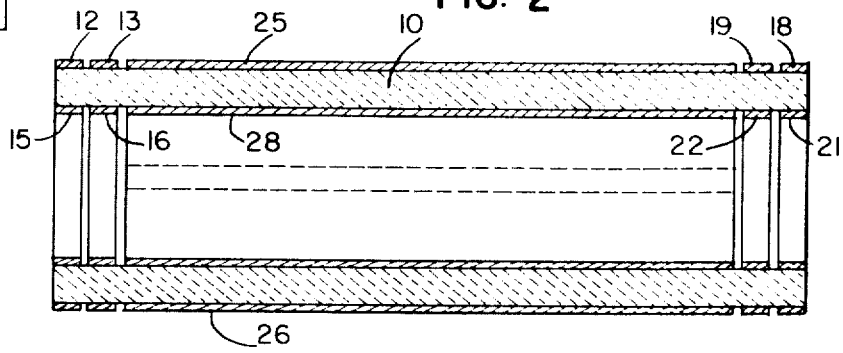
FIG 2 is a cross-sectional view of the delay line of FIG. 1.

Referring to FIGS. 1 and 2 there is shown a delay line formed from a piezoelectric crystal 10 shaped as a tube. The mean diameter of the tube is less than one-half the wavelength of the highest frequency to be propagated by the delay line. The mean diameter is defined as the diameter of the circle dividing the cross-sectional area of the tube into two equal portions. The input electrode structure consists of two pairs of conductors 12, 13, 15 and 16 formed on the inner and outer surfaces at one end of the piezoelectric tube. The output electrode structure consists of two pairs of conductors 18, 19, 21 and 22 formed in the same manner as the input electrodes, at the opposite end of the tube. A control electrode 28, separated from the intermediate the input and output electrodes is formed on the inside surface of the tube. A pair of control electrodes 25 and 26 are formed on the outside surface of the tube, separated from and intermediate the input and output electrodes.

An input signal from the signal input circuit 30 is applied to electrodes 12 and 15 which are connected together and to electrodes 13 and 16 which are connected together. Output electrodes 18 and 21 are connected together and to signal output circuit 31 and output electrodes 19 and 22 are connected together and to the signal output circuit 31 in a similar manner. A direct current potential is coupled to electrodes 25 and 26 from variable power supply 33. The direct current potential applied to electrodes 25 and 26 from supply 33 can be varied to vary the delay time of the delay line.

Figure 3:
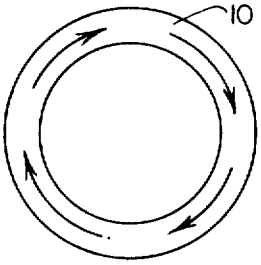
FIG. 3 is an end view of the ceramic tube of FIGS. 1 and 2 showing circumferential polarization.
Figure 4:
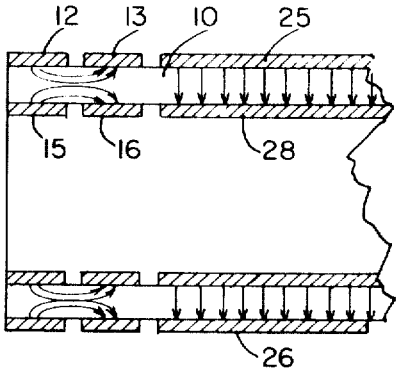
FIG. 4 is a cross-section of a portion of the delay line structure of FIG. 2 showing the axial electric fields.

Referring to FIG. 3, with the electrode structure shown in FIGS. 1 and 2 the piezoelectric crystal would be polarized circumferentially as shown by the arrows in FIG. 3. As shown in FIG. 4, input signals applied to electrodes 12, 13, 15 and 16 create an axial electric field in the piezoelectric crystal. With the crystal circumferentially polarized as shown in FIG. 3, the axial electric field causes the piezoelectric tube to vibrate in a torsional mode. The torsional vibration is propagated by the crystal from the input electrodes to the output electrodes. Referring again to FIG. 2 the output electrodes 18, 19, 21 and 22 develop electrical potentials thereacross in response to the torsional movement of the piezoelectric crystal. Since the velocity of propagation of the torsional vibration of the piezoelectric crystal is very much less than the velocity of propagation of an electrical signal, an appreciable delay is developed.

In FIGS. 1 and 2 electrodes 25 and 26 are connected to a variable DC power supply 33. Since the control electrode 28 positioned on the inner walls of the piezoelectric crystal is a continuous electrode, the assembly acts as a pair of series connected capacitors with the piezoelectric crystal material as the dielectric. As shown in FIG. 4, a potential applied to electrodes 25 and 26 develops an electric field in the piezoelectric crystal. This electric field acts on the crystal to change the velocity of propagation of the torsional wave through the crystal thereby changing the delay for a given length crystal. By adjusting the potential from variable power supply 33 as desired, the delay developed by the delay line can be varied. Thus expensive cutting and fitting of piezoelectric crystals is not required. The crystal can be cut to a nominal length to provide a desired delay and adjustment to the final required delay can be accomplished by varying the electric potential applied to electrodes 25 and 26. Furthermore, the amount of delay could be automatically adjusted by appropriate circuitry to maintain the desired delay with changes in circuit parameters and with temperature changes.

Figure 5:
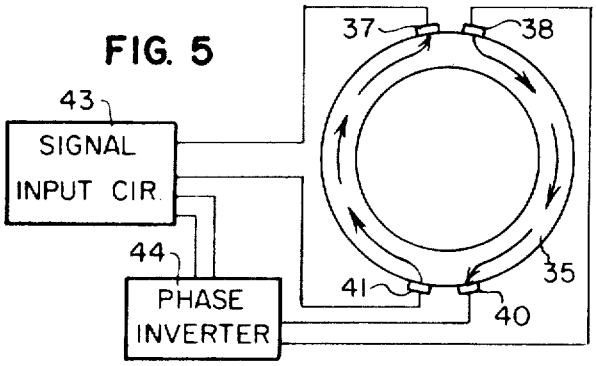
FIG. 5 is an end view of a piezoelectric tube showing the structure by which circumferential electric fields are obtained in the tube.

The structure described above deals with a circumferentially polarized piezoelectric crystal and an axial electric field produced by the input electrodes. A structure could also be used wherein the field is circumferential and the crystal is axially polarized. In FIG. 5 there is shown a structure by which a circumferential electric field can be developed in an axially polarized crystal piezoelectric crystal 35. The input signal is fed from the signal input circuit 43 directly to electrode structures 37 and 41. The signal from signal input circuit 43 is also coupled to electrodes 38 and 40 through phase inverter 44. By inverting the phase of the signal applied to the adjacent electrodes the field developed in the piezoelectric crystal is substantially circumferential.

Figure 6:
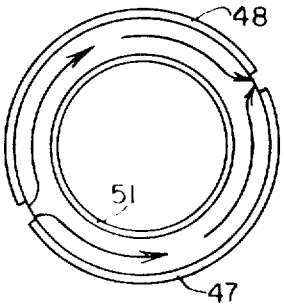
FIG. 6 is an end view of the delay line structure showing the position of the electrodes for circumferential fields and radial polarization.
Figure 7:
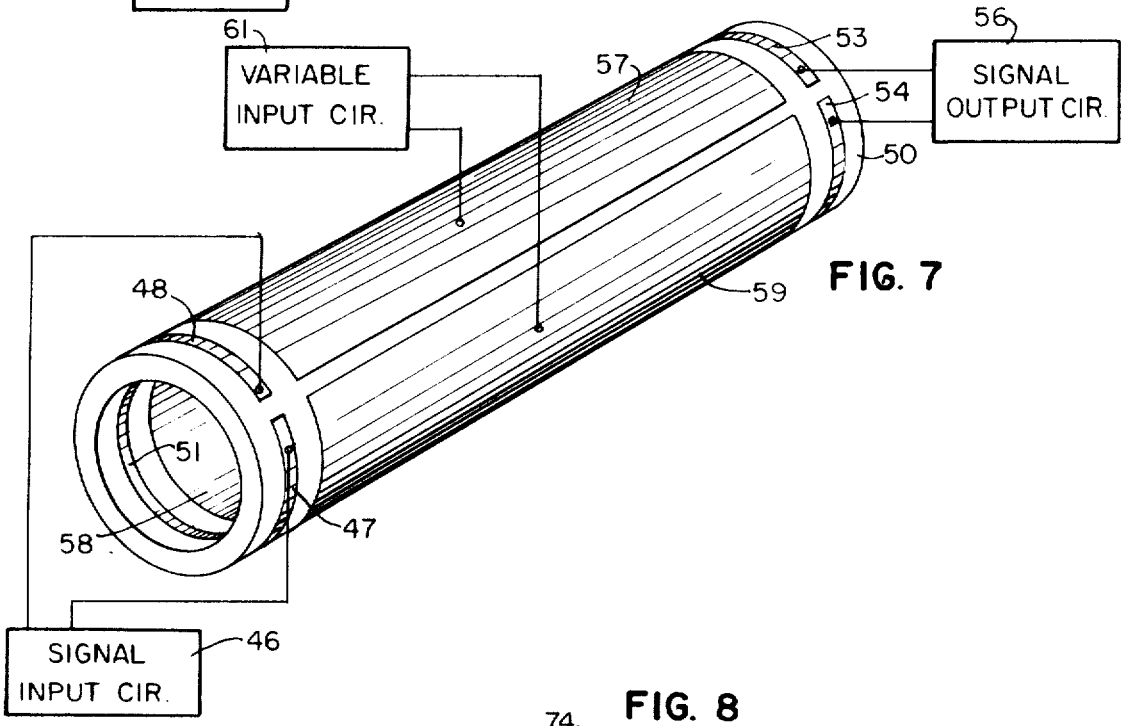
FIG. 7 is an isometric view of the structure of FIG. 6.

Another structure for developing a torsional mode of vibration in a piezoelectric crystal is shown in FIGS. 6 and 7. In this structure signal input circuit 46 is coupled to input electrodes 47 and 48 which are positioned on the outside of piezoelectric crystal 50. Electrodes 47 and 48 are in the shape of narrow bands with each extending around slightly less than half the circumference of the crystal. Another narrow electrode 51 is positioned on the inside of the crystal opposite electrodes 47 and 48 and extends around the entire inside circumference of the crystal. Output electrodes 53 and 54, formed in a manner similar to electrodes 47 and 48, are connected to signal output circuit 56. A continuous electrode (not shown) is positioned on the inside of the tube opposite electrodes 53 and 54 in the same manner as electrode 51 is positioned opposite electrodes 47 and 48. Electrodes 57, 58 and 59 are formed intermediate the input and output electrodes in the same manner as electrodes 25, 28 and 26 of FIG. 1. Electrodes 57 and 59 are connected to variable power supply 61 for adjusting the delay time of the delay line. The piezoelectric crystal 50 is radially polarized and the application of the voltage to electrodes 47 and 48 develops a circumferential electric field, as shown in FIG. 6, which in combination with the radial polarization of the crystal develops a torsional mode of vibration in the delay line.

Figure 8:
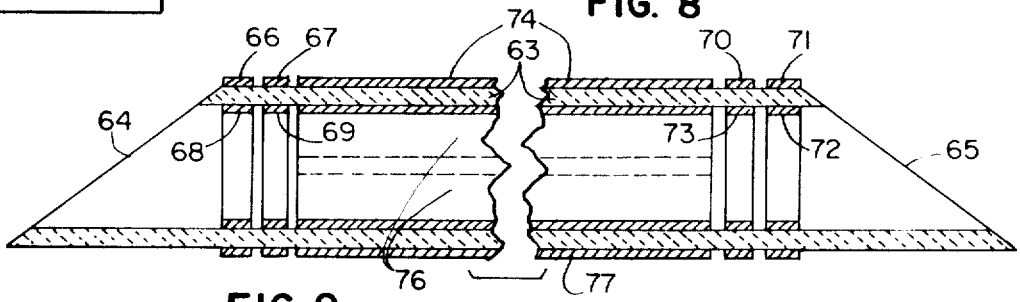
FIG. 8 is a cross-sectional view of a portion of the ceramic delay line showing structure by which reflections are minimized.

The torsional wave developed in the piezoelectric crystal is propagated in both directions from the input electrodes and to prevent undesirable reflections from the ends of the crystals, and the resulting signal degradation, it may be desirable to attenuate the propagation in one direction. A structure for doing this is shown in FIG. 8 where the piezoelectric crystal 63 has its end 64 beveled to attenuate the torsional wave propagated to the left from input electrodes 66, 67, 68 and 69. End 65 of crystal 63 is also beveled to prevent reflection after the wave reaches output electrodes 70, 71, 72 and 73. Control electrodes 74, 76 and 77 act in the same manner as control electrodes 25, 28 and 26 of FIG. 2.

Figure 9:
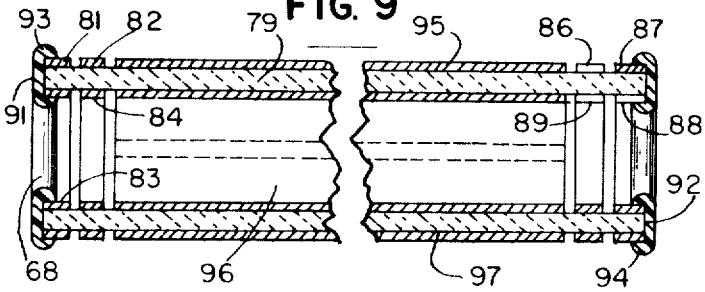
FIG. 9 is a cross-section of a portion of the delay line showing another structure by which reflections are minimized.

In FIG. 9 there is shown another structure by which reflections may be reduced. Piezoelectric crystal 79 is provided with input electrodes 81, 82, 83 and 84 and output electrodes 86, 87, 88 and 89. The ends 91 and 92 of the crystal are covered with a heavy metallic material 93 and 94 which, for example, may be a plating of lead, and which may or may not partially or completely cover the electrode structure. The heavy non-metallic material thus deposited acts to attenuate reflections of the torsional wave in one direction as required. Control electrodes 95, 96 and 97 act in the same manner as control electrodes 25, 28 and 26 of FIG. 2.

Referring to FIGS. 10–13 there is shown a delay line formed as a piezoelectric crystal 101 having a rectangular cross-section. The delay line of FIG. 10 can be considered as similar to the delay line of FIG. 1 cut along one side of the cylinder, opened and flattened.

Figure 10:
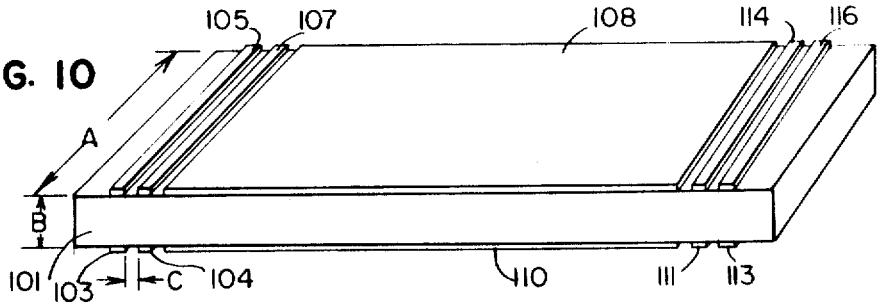
FIG. 10 is an isometric view of a flat delay line having a rectangular cross-section.

The delay line of FIG. 10 includes piezoelectric crystal 101 having an input electrode structure consisting of two pairs of conductors 105 and 107 and 103 and 104 formed on the top and bottom surfaces at one end of the delay line. The output electrode structure consists of two pairs of conductors 114, 116, 111 and 113, formed in the same manner as the input electrodes, at the opposite end of piezoelectric crystal 101. Control electrodes 108 and 110 separated from and intermediate the input and output electrodes are formed on the top and bottom surfaces of the piezoelectric crystal.

Figure 12:
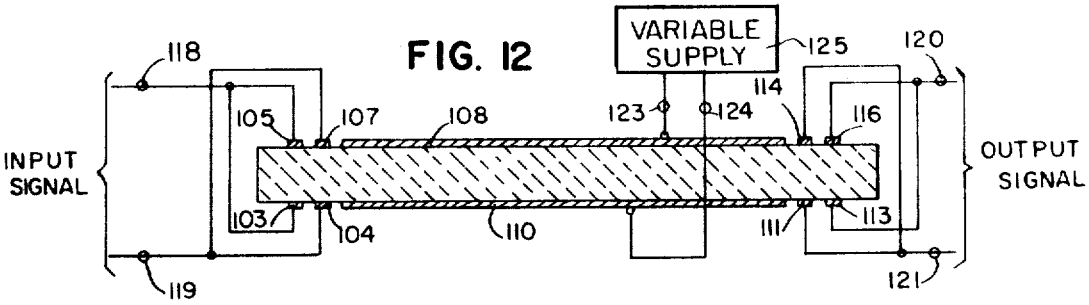
FIG. 12 is a cross-sectional view of the delay line of FIG. 10 showing the electrodes.

Referring to FIG. 12, there is shown a cross-sectional view of the piezoelectric crystal with the electrode structure of FIG. 10. Wire 118 is coupled to electrodes 103 and 105 while wire 119 is coupled to electrodes 104 and 107. Wires 118 and 119 carry the input signal and apply this signal between electrodes 103 and 104 and also between electrodes 105 and 107. Wire 120 is connected to electrodes 113 and 116 while wire 121 is connected to electrodes 111 and 114. The electrical signal developed across electrodes 114 and 116 and also across electrodes 111 and 113 are coupled to wires 122 and 120 for application to output circuitry. Wires 123 and 124 connect variable supply 125 to electrodes 108 and 110 respectively.

Figure 11:
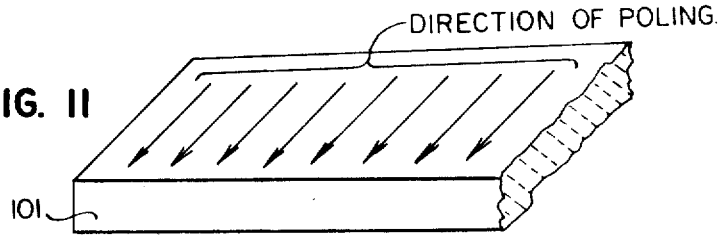
FIG. 11 shows the direction of polarization of the delay line of FIG. 10.
Figure 13:
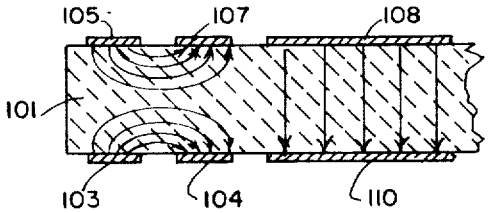
FIG. 13 is a cross-sectional view of a portion of the delay line of FIG. 10 showing the fields developed by the electrodes.

In FIG. 13 the electric fields produced by electrodes 105, 107, 103, 104, 108 and 110 are shown. Piezoelectric crystal 101 is made sufficiently thin so that the signals applied between electrodes 103 and 104 and 105 and 107 produce an electric field between the electrodes substantially perpendicular to the direction of polarization of the crystal. The direction of polarization of the crystal is shown in FIG. 11. With the electric fields perpendicular to the direction of polarization, as shown in FIGS. 11 and 13, a torsional mode of vibration is developed within the crystal which is propagated from the input electrodes to the output electrodes. The torsional mode of vibration across the output electrodes develops an electrical signal at the output electrodes substantially the same as the input signal. Since the velocity of propagation of the torsional mode vibration in the piezoelectric crystal is very much less than the velocity of propagation of an electrical signal, an appreciable delay is developed.

As shown in FIG. 12, electrodes 108, 110 are coupled to a variable power supply 125. A voltage applied from power supply 125 to electrodes 108 and 110 produces an electric field between electrodes 108 and 110 as shown in FIG. 13. The field between electrodes 108 and 110 is perpendicular to the direction of poling and also perpendicular to the direction of the field between the input electrodes. The electric field through piezoelectric crystal 101 between electrodes 108 and 110 changes the Young's modulus of the piezoelectric crystal and therefore changes the velocity of propagation of torsional mode vibrations. Thus the amount of delay between the input and output electrodes can be changed by changing the potential applied to electrodes 108 and 110.

In order to have good directivity, the width of the piezoelectric crystal (A, FIG. 10) should be at least 20 times the wavelength of the lowest frequency to be propagated. The thickness of the crystal (B) should be less than $\lambda/2$ at the highest frequency to be propagated and the spacing between the electrodes (C) should be less than $\lambda/2$ at the highest frequency to be propagated.

In each of the above structures the input and output transducers are an integral part of the delay line structure. Thus the insertion losses which are present with separate transducers are greatly reduced. The control electrodes positioned along the delay line are responsive to an applied potential to vary the velocity of propagation of the delay line and thus the magnitude of the delay time.

What is claimed is:

1. A signal delay device responsive to an input signal to provide an output signal substantially the same as the input signal a predetermined time following the application of the input signal to the delay device, said delay device including in combination, a hollow tube formed of piezoelectric material and having an input end portion, an opposing output end portion and first and second orthogonal dimensions, said tube having a mean diameter less than one-half the wavelength of the highest frequency of the input signal, said tube further having polarization in the direction of one of said first and second orthogonal dimensions, input electrode means positioned on said input end portion and adapted to receive the input signal, said input electrode means being responsive to the input signal to develop an electric field in said tube in the other of said dimensions thereby creating torsional movement of said input end portion, said torsional movement of said input end portion being propagated by said tube to said output end portion, and output electrode means positioned on said output end portion and being responsive to said torsional movement of said tube to develop the output signal, *control means intermediate said input and output end portions for developing a voltage gradient across the walls of said tube, the magnitude of said voltage gradient acting to determine the velocity of said torsional movement in said tube whereby the magnitude of said delay is determined.*

2. The delay device of claim 1 wherein, said first orthogonal dimension is an axial dimension and said second orthogonal dimension is a circumferential dimension.

3. The delay device of claim 2 wherein, said tube has inner and outer surfaces, *and said* control means *is* positioned on said surfaces intermediate said input and output end portions, said control means being adapted to receive a control potential and being responsive thereto to develop [a] *said* voltage gradient across the walls of said tube[, the magnitude of said control potential acting to determine the velocity of said torsional movement in said tube whereby the magnitude of said delay is determined].

4. The delay device of claim 3 wherein, said piezoelectric tube is polarized in the direction of said circumferential dimension, said input electrode means comprises a pair of first input conductors positioned at said input end portion of said tube on said inner and outer surfaces, and each extending around the circumference of said tube, said pair of first input conductors being separated by the walls of said tube and further being electrically connected together, said input electrode further having a second pair of input conductors positioned at said input end portion of said tube on said inner and outer surfaces and each extending around the circumference of said tube, said pair of second input conductors being separated by the walls of said tube, electrically connected together and spaced apart from said first pair of conductors, said output electrodes comprise a pair of first output conductors positioned at said output end portion of said tube on said inner and outer surfaces and each extending around the circumference of said tube, said pair of first output conductors being separated by the walls of said tube and further being electrically connected together, said output electrodes having a second pair of conductors positioned at said output end portion of said tube on said inner and outer surfaces and each extending around the circumference of said tube, said pair of second output conductors being separated by the walls of said tube, spaced apart from said first pair of electrodes and electrically connected together.

5. The delay device of claim 3 wherein, said piezoelectric tube is polarized in said axial dimension, said input electrode means comprise first, second, third and fourth input electrodes positioned at one end of said tube on the outer surface thereof with said first and second electrodes being diametrically opposed to said third and fourth electrodes, said output electrode means comprise first, second, third and fourth output electrodes positioned at the other end of said tube on the outer surface thereof with said first and second output electrodes being diametrically opposed to said third and fourth output electrodes, a first phase inverter adapted to receive the input signal and separately coupled to said second and third electrodes, said first and second electrodes being adapted to receive the input signal whereby the input signal coupled to said second and third electrodes is phase reversed with respect to the input signal coupled to said first and fourth electrodes.

6. The delay device of claim 3 wherein, said control means includes a first control electrode positioned on said outer surface and extending along approximately one-half a circumference thereof, a second control electrode positioned on said outer surface and extending along approximately the remaining one-half of said circumference of said outer surface, and a third control electrode positioned on said inner surface of said tube [ad] *and* extending along substantially all of a circumference of said inner surface, said circumferences of said inner and outer surfaces being oppositely positioned.

7. The delay device of claim 6 and further including, a power supply coupled to said first and second control electrodes for supplying a control potential thereto, said power supply including means for varying said control potential whereby the velocity of propagation of said torsional movement through said delay device is varied.

8. The delay device of claim 1 wherein, said tube has inner and outer surfaces, said first orthogonal dimension is a radial dimension and said second orthogonal dimension is a circumferential dimension, said piezoelectric [crystal] *material* being polarized in one direction parallel to said circumferential dimension along approximately one-half the circumference of said tube and in an opposite direction parallel to said circumferential dimension along approximately the other half of the circumference of said tube, *and said* control means *is* positioned on said inner and outer surfaces [intermediate said input and output end portions, said control means being] *and is* adapted to receive a control potential, [and] being responsive thereto to develop said voltage gradient across the walls of said tube.

9. The delay device of claim 8 wherein said input electrode means includes a first input conductor positioned on said outer surface and extending along approximately one-half a first circumference of said outer surface, a second input conductor positioned on said outer surface and extending along approximately the other half of said first circumference of said outer surface, and a third input conductor positioned on said inner surface and extending along substantially all of a first circumference of said inner surface, said first circumference of said inner surface and said first circumference of said outer surface being positioned opposite each other, said output electrode means includes a first output conductor positioned on said outer surface and extending along approximately one-half a second circumference of said outer surface, a second output conductor positioned on said outer surface and extending along approximately the other half of said second circumference, and a third output conductor positioned on said inner surface and extending along substantially all of a second circumference of said inner surface, said second circumference of said inner surface and said second circumference of said outer surface being positioned opposite each other.

10. The delay device of claim 9 wherein, said control electrode means includes a first control electrode positioned on said outer surface and extending along approximately one-half of a third circumference thereof, a second control electrode positioned on said outer surface and extending along approximately the remaining one-half of said third circumference of said outer surface, and a third control electrode positioned on said inner surface of said tube and extending along substantially all of a third circumference of said inner surface, said third inner and outer circumference being oppositely positioned.

11. The delay device of claim 10 and further including a power supply coupled to said first and second control electrodes for supplying a control potential thereto, said power supply including means for varying said control potential whereby the velocity of propagation of said torsional movement through said delay device is varied.

12. A signal delay device responsive to an input signal to provide an output signal substantially the same as the input signal a predetermined time following the application of the input signal to the delay device, said delay device including in combination, in integral piezoelectric crystal having an input end portion, an opposing output end portion and first and second orthogonal dimensions, said piezoelectric crystal further having polarization in the direction of one of said first and second orthogonal dimensions, input electrode means positioned on said input end portion and adapted to receive the input signal, said input electrode means being responsive to the input signal to develop an electric field in said piezoelectric crystal in the other of said orthogonal dimensions thereby creating torsional movement of said input end portion, said torsional movement of said input end portion being propagated by said piezoelectric crystal to said output end portion, and output electrode means positioned on said output end portion and being responsive to said torsional movement of said [tube] *crystal* to develop the output signal, control means positioned on the surface of said piezoelectric crystal intermediate said input and output electrode means, said control means being adapted to receive a control potential, and being responsive thereto to develop a voltage gradient across the piezoelectric crystal perpendicular to each of said first and second orthogonal dimensions, the magnitude of said control potential acting to determine the velocity of said torsional movement in said *crystal* [tube] whereby the magnitude of said delay is determined.

13. The signal delay device of claim 12 wherein, said piezoelectric crystal is flat with rectangular cross-section and further has width, length and thickness dimensions, said one of said first and second orthogonal dimensions being parallel to said width dimension, said other of said first and second orthogonal dimension being parallel to said length dimension, said control means comprising first and second electrodes positioned on first and second opposing surfaces of said piezoelectric crystal respectively to develop said voltage gradient in a direction parallel to said thickness dimension.

14. The signal device of claim 13 wherein, said input electrode means comprises first and second conductors positioned on said first surface and third and fourth conductors positioned on said second surface at said input end portion of said crystal, said first and third conductors of said input electrode means being positioned opposite each other and being electrically connected together, said second and fourth conductors of said input electrode means being positioned opposite each other, electrically connected together and spaced apart from said first and third conductors of said input electrode means respectively, said output electrode means comprise first and second conductors positioned on said first surface and third and fourth conductors positioned on said second surface at said output end portion of said crystal, said first and third conductors of said output electrode means being positioned opposite each other and being electrically connected together, said second and fourth conductors of said output electrode means being positioned opposite each other, electrically connected together and spaced apart from said first and third conductors of said output electrode means respectively.

15. The signal delay device of claim 14 wherein, said first and third conductors and said second and fourth conductors of said input and output electrode means are spaced apart a distance less than one-half the wavelength of the highest frequency to be propagated, said thickness dimension is less than one-half the wavelength of the highest frequency to be propagated and said width dimension is at least twenty times the wavelength of the lowest frequency to be propagated.

(References on following page)

References Cited

The following references, cited by the Examiner, are of record in the patented file of this patent or the original patent.

UNITED STATES PATENTS

| | | | |
|---|---|---|---|
| 2,711,515 | 6/1955 | Mason | 333—30 R |
| 2,828,470 | 3/1958 | Mason | 333—30 R |
| 3,213,207 | 10/1965 | Munk | 310—9.8 X |
| 3,246,164 | 4/1966 | Richmond | 333—30 R X |

| | | | |
|---|---|---|---|
| 3,296,585 | 1/1967 | Toott | 333—30 R X |
| 3,425,002 | 1/1969 | Okamura | 333—30 R X |

FOREIGN PATENTS

| | | | |
|---|---|---|---|
| 758,647 | 10/1956 | Great Britain | 333—30 M |

PAUL L. GENSLER, Primary Examiner

U.S. Cl. X.R.

310—9.8